Sept. 29, 1925.
A. D. PURTLE ET AL
1,555,157
RADIUS ROD
Filed Sept. 15, 1923
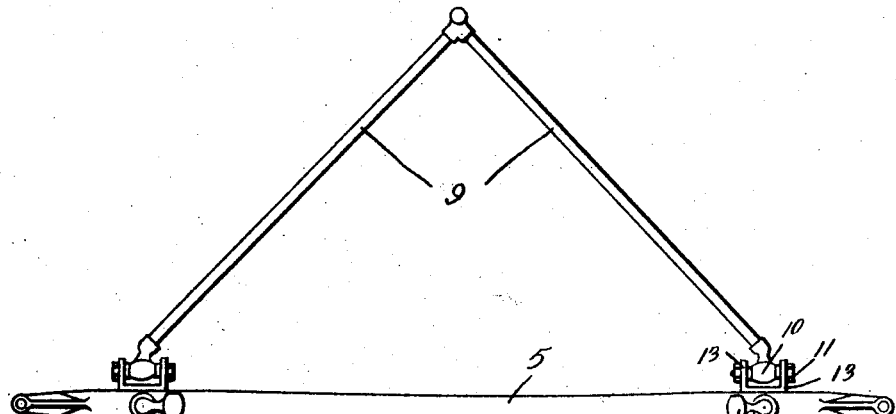
Fig. 1.
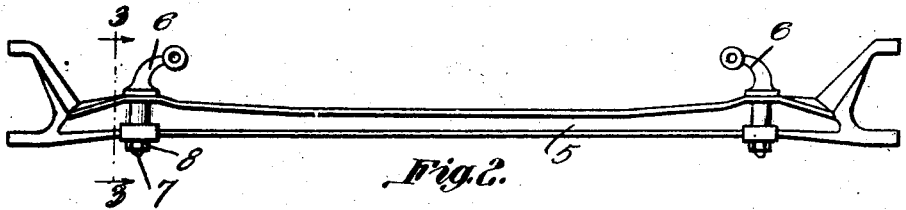
Fig. 2.
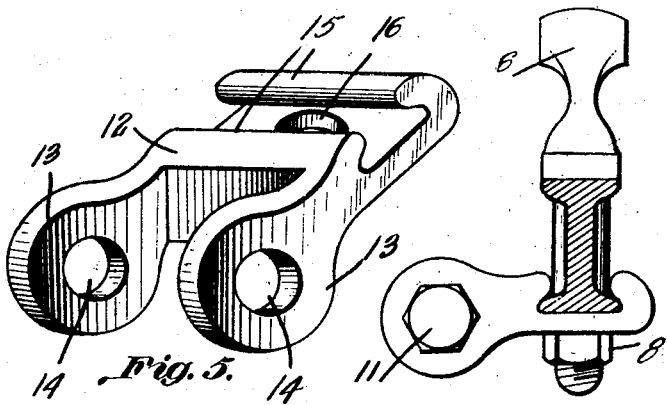
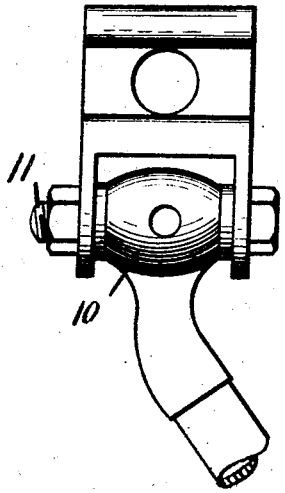
A.D. Purtle.
D.C. Harra. Inventors Patented Sept. 29, 1925.

1,555,157

UNITED STATES PATENT OFFICE.

ALBERT D. PURTLE AND DELMAR C. FARRA, OF MARIETTA, OHIO.

RADIUS ROD.

Application filed September 15, 1923. Serial No. 662,889.

*To all whom it may concern:*

Be it known that we, ALBERT D. PURTLE and DELMAR C. FARRA, citizens of the United States, residing at Marietta, in the county of Washington and State of Ohio, have invented a new and useful Radius Rod, of which the following is a specification.

This invention relates to automobile radius rod construction, the primary object of the invention being to provide novel means for connecting the forward ends of the radius rods of a motor vehicle construction to the front axle thereof, the connection being such as to permit of slight movement of the radius rods with respect to the axle or vice versa.

Another object of the invention is to provide a device of this character which may be readily and easily applied to the usual motor vehicle construction, eliminating the necessity of making extensive alterations to apply the same.

Another important object of the invention is to provide means whereby radius rods may be lowered readily allowing more room for a mechanic to make repairs.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view disclosing radius rods and the connection between the radius rods and the front axle.

Figure 2 is a front elevational view disclosing the connecting brackets as secured to an axle.

Figure 3 is a sectional view taken on line 3—3 of Figure 2.

Figure 4 is an enlarged detail view of the bracket and radius rod connection.

Figure 5 is a perspective view of one of the brackets.

Referring to the drawing in detail, the reference character 5 designates an axle which supports the usual spring perches 6 that have threaded extensions 7 extending therethrough, which extensions accommodate the nuts 8.

The radius rods which have connection with the front axle 5 are indicated at 9, and are formed with heads 10 provided with transverse openings to accommodate the bolts 11 that connect the radius rod to the brackets supporting the same. These brackets form the essence of the present invention and include body portions 12. Each of the body portions embodies a pair of spaced arms 13 formed with openings 14 through which the bolt 11, associated therewith passes, it being understood that the connection between the bolt and head 10 is such as to permit of slight vertical movement of the radius rods, with respect to the brackets to compensate for movement of the front axle incident to the passing of the vehicle over irregular road surfaces.

Flanges 15 are formed on each bracket which flanges extend inwardly as clearly shown by Figure 5 of the drawing, in a manner to grip the lower flange of an axle to hold the bracket against lateral movement with respect to the axle.

Formed in the bracket, intermediate the side edges thereof, is an opening indicated at 16, which opening is designed to accommodate the threaded portion of the usual spring perch, whereby the device may be secured in position.

From the foregoing it will be obvious that by removing the usual nuts that secure the spring perches to an axle, the brackets forming the essence of the present invention may be readily and easily positioned thereon, and the radius rod connected thereto in a manner to allow slight movement of the radius rod with respect to the axle, or vice versa.

What is claimed as new is:—

A bracket for securing radius rods to axles, said bracket including upwardly and inwardly extended integral flanges, the portion of the bracket between the flanges being supplied with an opening to accommodate the securing end of a perch iron of a spring support, spaced arms formed integral with the bracket and having openings to pivotally receive a radius rod.

In testimony that we claim the foregoing as our own, we have hereto affixed our signatures.

ALBERT D. PURTLE.
DELMAR C. FARRA.